US010747208B2

(12) United States Patent
Debes et al.

(10) Patent No.: US 10,747,208 B2
(45) Date of Patent: Aug. 18, 2020

(54) SYSTEM AND MICROSERVICE FOR MONITORING A PLANT OF PROCESS AUTOMATION

(71) Applicant: CodeWrights GmbH, Karlsruhe (DE)

(72) Inventors: Thomas Debes, Sinzheim (DE); Michael Gunzert, Karlsruhe (DE)

(73) Assignee: CODEWRIGHTS GMBH, Karlsruhe (DE)

( * ) Notice: Subject to any disclaimer, the term of this patent is extended or adjusted under 35 U.S.C. 154(b) by 291 days.

(21) Appl. No.: 15/823,920

(22) Filed: Nov. 28, 2017

(65) Prior Publication Data

US 2018/0164791 A1 Jun. 14, 2018

(30) Foreign Application Priority Data

Dec. 14, 2016 (DE) .......................... 10 2016 124 348

(51) Int. Cl.
*G06F 15/173* (2006.01)
*G05B 19/418* (2006.01)
*H04L 29/06* (2006.01)
*H04L 29/08* (2006.01)

(52) U.S. Cl.
CPC ........... *G05B 19/41855* (2013.01); *G05B 2219/1134* (2013.01); *G05B 2219/1135* (2013.01); *G05B 2219/14006* (2013.01); *H04L 67/12* (2013.01); *H04L 69/08* (2013.01); *Y02P 90/185* (2015.11)

(58) Field of Classification Search
CPC . H04L 67/12; H04L 69/08; G05B 2219/1134; G05B 2219/14006; G05B 19/41835; G05N 2219/1135

USPC .................................................. 709/223–224
See application file for complete search history.

(56) References Cited

U.S. PATENT DOCUMENTS

| 8,812,914 B2* | 8/2014 | Jensen ............... G05B 19/0425 709/224 |
| 2003/0200285 A1 | 10/2003 | Hansen et al. |
| 2010/0287277 A1* | 11/2010 | De Groot ........... G05B 19/4184 709/224 |

(Continued)

FOREIGN PATENT DOCUMENTS

| DE | 10 2009 045 384 A1 | 4/2011 |
| DE | 10 2013 107 905 A1 | 1/2015 |
| EP | 2 988 183 A1 | 2/2016 |

OTHER PUBLICATIONS

German Search Report, German PTO, Munich, dated May 8, 2017.

*Primary Examiner* — Bharat Barot
(74) *Attorney, Agent, or Firm* — Bacon & Thomas, PLLC

(57) ABSTRACT

A system and a microservice for monitoring a plant of automation technology, wherein the plant has a plurality of field devices, the field devices can communicate via at least a first communication network with one another and with a control unit, comprising: an execution electronics, which can communicate with at least one of the field devices; and a configuration electronics, which is arranged removed from the execution electronics and which can communicate with the execution electronics via a second communication network, wherein the configuration electronics and/or the execution electronics has at least one microservice, which is appropriate for the type of the field device and which is embodied to provide at least one functionality for execution in the execution electronics and/or in the configuration electronics.

15 Claims, 1 Drawing Sheet

(56) References Cited

U.S. PATENT DOCUMENTS

| | | | |
|---|---|---|---|
| 2012/0290969 A1* | 11/2012 | Grossmann | H04L 67/12 715/780 |
| 2013/0190897 A1* | 7/2013 | Junk | G05B 19/418 700/12 |
| 2015/0281355 A1 | 10/2015 | Maturana et al. | |
| 2016/0182323 A1* | 6/2016 | Ferguson | H04L 43/045 709/224 |
| 2017/0090467 A1* | 3/2017 | Cincea | G05B 23/0205 |
| 2018/0164778 A1* | 6/2018 | Gunzert | G05B 19/406 |
| 2020/0036729 A1* | 1/2020 | Maneval | H04L 67/12 |

* cited by examiner

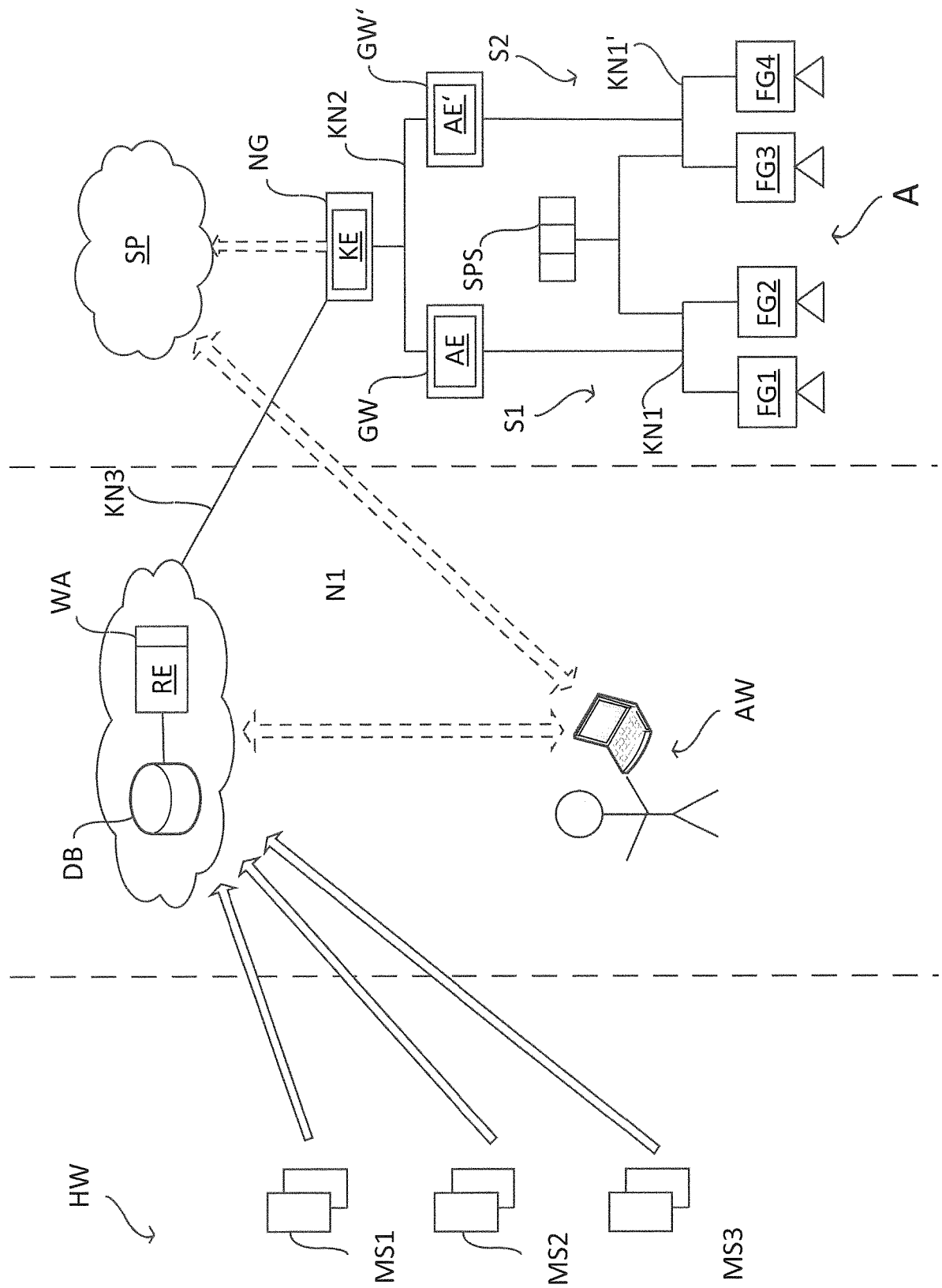

SYSTEM AND MICROSERVICE FOR MONITORING A PLANT OF PROCESS AUTOMATION

TECHNICAL FIELD

The invention relates to a system for monitoring a plant of automation technology. Furthermore, the invention relates to a microservice for use in the system of the invention.

BACKGROUND DISCUSSION

Known from the state of the art are field devices, which are used in industrial plants. In process automation, same as in manufacturing automation, field devices are often applied. Referred to as field devices are, in principle, all devices, which are applied near to the process and which deliver, or process, process relevant information. Thus, field devices are used for registering and/or influencing process variables. Serving for registering process variables are measuring devices, e.g. sensors. These are used, for example, for pressure- and temperature measurement, conductivity measurement, flow measurement, pH measurement, fill level measurement, etc., and register the corresponding process variables, pressure, temperature, conductivity, flow, pH-value, fill level, etc. Used for influencing process variables are actuators. These are, for example, pumps or valves, which can influence the flow of a liquid in a pipe or the fill level in a container. Besides the above mentioned measuring devices and actuators, understood to be field devices are also remote I/Os, radio adapters, and, generally, devices, which are arranged at the field level.

A large number of such field devices are produced and sold by the Endress+Hauser group.

In modern industrial plants, field devices are, as a rule, connected via communication networks, such as, for example, fieldbusses (ProfiBus®, Foundation® Fieldbus, HART®, etc.), with superordinated units. Superordinated unit include control units, such as, for example, a PLC (programmable logic controller). Superordinated units serve, among other things, for process control, as well as for start-up of the field devices. The measured values registered by field devices, especially sensors, are transmitted via the particular bus system to one or more superordinated units, which, in given cases, further process the measured values and forward them to the control room of the plant. The control room serves for process visualizing, process monitoring and process control via the superordinated units. Along with that, also data transmission from the superordinated unit via the bus system to the field devices is required, especially for configuration and parametering of field devices as well as for operating actuators.

The communication networks are, as a rule, closed bus systems, which provide no outwardly freely configurable, or freely accessible data interfaces. A further use of the data generated and/or exchanged within the communication network outside of the communication network is thus difficult and is not implementable without cooperation of the system provider.

For users, who apply different bus systems in their plants, there is basically no possibility to bring together data from these different bus systems into a central system at an acceptable cost/benefit ratio.

Technologies, such as, for example, the OPC Unified Architecture (OPC UA for short) offer an opportunity for representing data in a universal information model, however, such requires the acceptance and integration of the needed software components into all participating bus systems and field devices. While this can be done for plants with a manageable number of field devices, the effort and requirements increase, when these field devices are geographically distributed. The amount of data balloons in size, moreover, with an increasing number of field devices, which, in turn, leads to the fact that a corresponding infrastructure must be present and power demands must be fulfilled.

With increased technological development in recent times in the fields of "IoT" ("Internet of Things") and "Industry 4.0", in the meantime, technologies, tools and services have become available also for registering, processing and storing large amounts of data (keywords for this are "Cloud", "Web Services", "Big Data Analytics", etc.). Unsolved, currently, however, is still the posed problem of generically providing data of field devices registered via heterogeneous communication paths and offering the user, as simply as possible, options for further processing independently of operating system, driver standard or communication interface of the field devices. The current standards, both at the field level as well as also at the driver level, have technological dependencies, which strongly make difficult simple installation, configuration and updating in the case of new functions or in the case of removing safety/security problems. The support of mobile platforms is, in such case, almost nonexistent.

SUMMARY OF THE INVENTION

Starting from this picture, an object of the invention is to provide access in simple manner to components of a communication network in a plant of process automation.

The object is achieved by a system for monitoring a plant of automation technology, wherein the plant has a plurality of field devices, wherein the field devices can communicate via at least a first communication network with one another and with a control unit, comprising:
an execution electronics, which can communicate with at least one of the field devices; and
a configuration electronics, which is arranged removed from the execution electronics and which can communicate with the execution electronics via a second communication network, wherein the configuration electronics and/or the execution electronics has at least one microservice, which is appropriate for the type of field device and which is embodied to provide at least one functionality for execution in the execution electronics and/or in the configuration electronics.

A great advantage of the system of the invention, is that, in simple manner, components in a plant of process automation can be accessed and functionalities executed. Needed for this are the mentioned execution electronics, which is located especially in a network component of the first communication network, and the configuration electronics, which is connected with the execution electronics by means of the second communication network.

The microservice is characterized by having a small file size, so that it requires little memory capacity in the configuration electronics, or in the execution electronics. The microservice is produced externally, for example, in a computer unit of a user.

Field devices, as mentioned in connection with the method of the invention, have already been described, by way of example, in the introduction above.

In a preferred embodiment of the system of the invention, it is provided that the microservice is embodied to provide at least one of the following functionalities:

reading-out of at least a part of data available in the field device;

decoding the read-out data;

extracting at least a part of information contained in the decoded data;

preprocessing the extracted information;

transmitting, especially securely, e.g. encrypted, the extracted or preprocessed information to a service platform, especially by means of an IoT protocol.

The functionalities can be interconnected with one another, so that a plurality of functionalities can be executed at runtime.

With the read-out data, in the case of which preferably involved are static device data, especially parameter values and/or configuration data, and/or dynamic device data, especially measured values and/or diagnostic values, there is the opportunity to perform process optimizations and plant preventative maintenance based on sufficiently great data amounts.

The terminology, preprocessing, means, especially, that the read-out data are combined and transmitted so grouped. It can also be provided that the data is converted into a special format, for example, into an XML format.

Used for encrypting is, for example, an SSL (Secure Sockets Layer) or TLS (Transport Layer Security) encryption protocol.

In an additional preferred embodiment of the system of the invention, it is provided that the data is static device data, especially parameter values and/or configuration data, and/or dynamic device data, especially measured values and/or diagnostic values.

In a preferred further development, the system of the invention includes an application executed in a computing unit arranged removed from the execution electronics and from the configuration unit and embodied to access the configuration electronics by means of a third communication network. Especially involved, in such case, is a Web application, which a user can access by means of its computing unit. The third communication network is especially a LAN connection, by means of which the computing unit is connected with the configuration electronics.

In an especially advantageous further development of the system of the invention, the configuration electronics and/or the application are/is embodied to replace the microservice contained in the configuration electronics/and or in the execution electronics, or to update such and/or to load other microservices (MS1, MS2, MS3) into the configuration electronics (KE) and/or into the execution electronics (EE), wherein the terminology, updating, means especially changing a portion of the field devices, from which data are to be read out, changing the at least one part of data available in the portion of the field devices and/or a changing a protocol, especially the IoT protocol, by means of which the extracted or preprocessed information is transmitted into the service platform.

In the first case, the user can, in simple manner, perform changes of a microservice by means of the Web application. If it would like, for example, that other data of a field device can be transmitted into the service platform, then it selects the desired data in the Web application. The so changed microservice is then transmitted into the configuration electronics, or into the execution electronics. Alternatively, it selects preconfigured microservices, which include certain functionalities, and loads these by means of the Web application into the configuration electronics, or into the execution electronics.

In the second case, the configuration electronics is able to replace the microservices. In an example of an embodiment, the remote computing unit includes for this a "microservice store", analogous to an "app store" known from the telecommunications industry, which can be accessed from the configuration electronics and into which configuration electronics microservices from the "microservice store" can be downloaded. The downloaded microservices can then be managed and configured in the configuration unit. Then, these are, for example, loaded into the execution electronics and executed there.

Thus, it is possible for a user to select specific data of field devices of the plant, automatically to process such additionally and to make these data available to a system of its choice, e.g. the service platform. Additionally, a user is provided an opportunity to manage comfortably an occasionally large number of field devices and their data independently of the location of user and to distribute changes of the functionalities rapidly, centrally, and, in given cases, device specifically.

In an advantageous embodiment of the system of the invention, it is provided that the configuration electronics and/or the application is embodied to replace or to update the microservice, without interrupting ongoing operation of the configuration electronics or the execution electronics. The replacing or updating of the microservices occurs thus comfortably at runtime, whereby time can be saved. All microservices can be dynamically reloaded and updated at runtime, without risks for already running systems arising.

In an advantageous embodiment of the system of the invention, it is provided that the microservice has a digital signature, and the configuration electronics and/or the execution electronics is embodied only to accept microservices with valid digital signatures. Only such microservices are thus installed and executed in the configuration electronics. In this way, it is prevented that unauthorized microservices with undesired functionalities can be executed. The configuration electronics, in such case, tests the digital signatures of the microservices.

In an advantageous embodiment of the system of the invention, it is provided that the execution electronics is integrated into a gateway. A gateway is a device, which can exchange data between different networks, which use different network protocols. The data can be generated by tapping the cyclic data traffic transmitted in the first communication network and/or be read-out by active queries of the data from the field devices. In the case of tapping, the gateway does not have to be made known to the communication network, since it is not actively participating in the communication, but, instead, only receives data transmitted in the communication network. Such a gateway is described, for example, in German Patent, DE 10 2008 019 053 B4.

In an advantageous further development of the system of the invention, it is provided that the configuration electronics is integrated into a network device, especially into a router or into a switch.

The developmental effort and the provisioning time of such a system of the invention are, thus, shortened, since already existing devices (gateway, router, switch) can be adapted.

In an especially advantageous embodiment of the system of the invention, it is provided that the service platform is contactable via the Internet and is embodied as a cloud computing web service. Examples of such service platforms are Amazon Web Services and Microsoft Azure. The invention can, in simple manner, also be adapted for new, user-specific, service platforms, which serve as data receivers.

In an advantageous further development of the system of the invention, it is provided that the first communication network is a wireless or wired fieldbus according to a fieldbus protocol of automation technology. In principle, in such case, any protocol of a wired fieldbus automation technology, such as Foundation Fieldbus®, Profibus®, Profinet®, HART®, ModBus®, Industrial Ethernet, etc. can be used. An example of a wireless network protocol is, for example, the wireless HART protocol.

In a preferred further development of the system of the invention, it is provided that the second communication network has an industrial Ethernet protocol, especially Ethernet/IP, HART-IP or Profinet. For communication via the third network, an IoT (Internet of Things) protocol is used, for example, MQTT, AMQP, MTConnect or OPC-UA.

In a preferred further development of the system of the invention, it is provided that the third communication network is a Local Area Network.

It is also possible that the computing unit accesses the configuration electronics by means of the Internet. Advantageously, the computing unit and the configuration electronics are integrated for this into a virtual private network, via which the data are transmitted.

Regarding the two communication networks, it is to be noted that the mentioned network- and protocol types are given by way of example and a large number of other suitable network- and protocol types are known to those skilled in the art.

Furthermore, the invention is achieved by a microservice for use in the system of the invention.

An especially advantageous further development of the microservice of the invention provides that the microservice is generated based on a device model produced from information concerning the field device. Especially involved, in such case, is a device description, especially a device description based on EDD or FDI technology. For this, the device description is analyzed and, for all readable device variables of the device type of the field device, information generated, which is required for reading-out and interpreting the data of the field device (for example, fieldbus command number, request data, the byte position of the datum in the response of the field device, the data type, the value range, the meaning of the enumeration values, etc.), wherein also dependencies of the device variables or index based commands are taken into consideration.

An advantageous embodiment of the microservice of the invention provides that the microservice is present in a binary and/or encrypted file format and/or is provided with a digital signature. In this way, hacking of the microservice is prevented.

BRIEF DESCRIPTION OF THE DRAWING

The invention will now be explained in greater detail based on the appended drawing, the sole FIGURE of which shows as follows:

FIG. 1 is an example of an embodiment of the system of the invention.

DETAILED DESCRIPTION IN CONJUNCTION WITH THE DRAWING

FIG. 1 shows an example of an embodiment of the system of the invention. In support of this, a plant A of process automation is displayed schematically. Plant A is composed of two segments S1, S2, which, in turn, are composed of first communication networks KN1 and KN1', respectively, and a plurality of field devices FD1, FD2, FD3, FD4. The segments S1, S2 are connected with a central control unit PLC. Examples and functions of such field devices FD1, FD2, FD3, FD4 have already been described in the introduction above.

Each of the segments S1, S2 is connected to a gateway GW and GW, respectively. The gateways GW, GW' are, in turn, connected via a second communication network KN2 with a network device ND in the form of a router or a switch.

Integrated in the gateways GW, GW' are execution electronics EE and EEC, respectively. The execution electronics are embodied to receive configuration tasks, and functionalities, from a superordinated system and to execute such. The superordinated system is a configuration electronics KE, which is integrated in the network device ND. The network device ND, also referred to as an edge device, can be part of a fog computing network, composed of a plurality of network devices ND connected with one another.

The functionalities describe, among other things, which data, or which part of data, should be read-out from at least part of the field devices FD1, FD2, FD3, FD4 by the gateways GW, GW'. Furthermore, the functionalities serve for decoding the read-out data, thus for understanding how the read-out data were encoded (fieldbus protocol, etc.) and how these encodings must be interpreted, in order to extract at least a part of information contained in the decoded data, for preprocessing the extracted information, and for transmitting, especially securely, e.g. encrypted, the extracted or preprocessed information to a service platform SP, wherein the functionalities establish, which protocol is used for the transmitting to the service platform SP.

The functionalities are provided by so-called microservices MS1, MS2, MS3. The microservices MS1, MS2, MS3 are contained in the configuration electronics KE. This executes the microservices MS1, MS2, MS3 and thereby makes available to the execution electronics EE, EEC the functionalities contained in the microservices.

Such a microservice MS1, MS2, MS3 exists for each field device type and is generated based on a device model, for example, an EDD- or an FDI device description, produced from information concerning the field device (FD1, FD2, FD3, FD4). These device descriptions contain occasionally not all information necessary for interpreting the data of the field devices FD1, FD2, FD3, FD4, or they contain methods, which can be integrated in such form only difficultly into a microservice MS1 MS2, MS3. Therefore, it can be provided that the device model is expanded by other means, for example, manually. From the expanded device model, then a corresponding microservice MS1, MS2, MS3 can be generated. In such case, it is independent of the manufacturer of a particular field device FD1, FD2, FD3, FD4.

The microservices MS1, MS2, MS3 exactly determine which data are read-out from which field devices FD1, FD2, FD3, FD4 and to which location these should be transmitted or provided. Advantageously, this providing of the data occurs not only generally for all field devices FD1, FD2, FD3, FD4 of a certain device type, but, instead, also reduced for certain purposes of use—, for example, limited to the data, which arise during certain operating modes of the field devices FD1, FD2, FD3, FD4—or even only for a specific field device FD1, FD2, FD3, FD4. In this way, not only the selection of the data relevant for the user UR is facilitated, but also the risk is reduced, that an incorrect microservice MS1, MS2, MS3, or a different behavior of a field device FD1, FD2, FD3, has unwanted effects on all supported field devices FD1, FD2, FD3.

Via the Internet, the configuration electronics KE is connected with a removed computing unit CU. This computing unit CU has access to a database DB, which has a plurality of preconfigured microservices MS1, MS2, MS3 for a large number of different field device types. The preconfigured microservices MS1, MS2, MS3 are provided from a manufacturer's facility MF and loaded into the database DB. Alternatively, the database DB is embodied as a microservice store, analogously to an app store, which the computing unit CU can access.

A user UR can use a computing unit to access the computing unit CU via Internet. Via an application WA, especially a Web Application, the user UR can select, which microservices MS1, MS2, MS3 with which functionalities should be loaded into the configuration electronics KE.

Furthermore, the user UR has the opportunity to change microservices MS1, MS2, MS3 and to replace, or update, microservices in the configuration electronics KE. For this, it selects a preconfigured microservice MS1, MS2, MS3 of the database, for example, for a certain device type, or it selects a microservice MS1, MS2, MS3 stored in the configuration electronics and changes its settings, thus its functionalities. For example, this includes a changing of a portion of the field devices FD1, G2, FD3, FD4, from which data are read out, a changing of the at least one part of data available in the portion of the field devices FD1, G2, FD3, FD4 and/or a changing of a protocol, especially of the IoT protocol, by means of which the extracted or preprocessed information are transmitted into the service platform SP.

For this, it is especially provided that the replacing or updating of the microservices MS1, MS2, MS3 occurs at runtime, without that operation of the configuration electronics KE, or the execution electronics EE, is interrupted or without that other risks occur.

The user UR can, furthermore, also access the service platform SP and further process data stored there. With the read-out data, in the case of which it preferably involves static device data, especially parameter values and/or configuration data, and/or dynamic device data, especially measured values and/or diagnostic values, there is the opportunity to perform process optimizations and preventative maintenance in the plant based on sufficiently great amounts of data.

Alternatively, the execution electronics EE is implemented in the network device ND, or the configuration electronics KE is implemented in the gateways GW, GW'. It can also be provided to implement the two electronics EE, KE in one device, for example the network device ND.

By means of the system of the invention, the user UR can, from a central position, access data of its plant A, and configure, how and which data should be brought up, independently of manufacturer, location and/or communication form (fieldbus interface, supported protocols, etc.) of a field device FD1, FD2, FD3, FD4. By using established IT protocols and methods, worldwide distributed data access by means of the Internet is limited only by IT-infrastructure, not, however, by the installed fieldbus structure (first and second communication networks KN1, KN1', KN2) of the plant A.

The examples of embodiments here are exclusively by way of example and the method of the invention is performable with any type and arrangement of field devices FD1, FD2, FD3, FD4 in segments S1, S2 of a plant A of process automation.

The invention claimed is:

1. A system for monitoring a plant of automation technology, wherein the plant has a plurality of field devices and the field devices can communicate via at least a first communication network with one another and with a control unit, comprising:
an execution electronics, which can communicate with at least one of the field devices; and
a configuration electronics, which is arranged removed from the execution electronics and which can communicate with the execution electronics via a second communication network, wherein:
said configuration electronics and/or the execution electronics has at least one microservice, which is appropriate for the type of the field device and which is embodied to provide at least one functionality for execution in the execution electronics and/or in the configuration electronics, wherein the microservice is generated based on a device model produced from information concerning the field device, wherein the device model is a EDD- or FDI-device description.

2. The system as claimed in claim 1, wherein:
said microservice is embodied to provide at least one of the following functionalities:
reading-out of at least a part of data available in the field device;
decoding the read-out data;
extracting at least a part of information contained in the decoded data;
preprocessing the extracted information; and
transmitting, especially securely, e.g. encrypted, the extracted or preprocessed information to a service platform by means of an IoT protocol.

3. The system as claimed in claim 2, wherein:
the data is static device data, parameter values and/or configuration data, and/or dynamic device data, measured values and/or diagnostic values.

4. The system as claimed in claim 2, further comprising:
an application executed in a computing unit arranged removed from said execution electronics and from said configuration electronics, and embodied to access said configuration electronics by means of a third communication network.

5. The system as claimed in claim 4, wherein:
said configuration electronics and/or said application are/is embodied to replace the microservice contained in said configuration electronics and/or in said execution electronics, or to update such and/or to load other microservices into said configuration electronics and/or into said execution electronics; and
the terminology, updating, means especially changing a portion of the field devices, from which data are to be read out, changing the at least one part of data available in the portion of the field devices and/or changing a protocol, especially an IoT protocol, by means of which the extracted or preprocessed information are transmitted into said service platform.

6. The system as claimed in claim 4, wherein:
said configuration electronics and/or said application is embodied to replace, or to update, said microservice, without interrupting ongoing operation of said configuration electronics or said execution electronics.

7. The system as claimed in claim 4, wherein:
said third communication network is a Local Area Network.

8. The system as claimed in claim 2, wherein:
said service platform is contactable via the Internet and is embodied as a cloud computing web service.

9. The system as claimed in claim 1, wherein:
said microservice has a digital signature; and the configuration electronics and/or said execution electronics is embodied only to accept microservices with valid digital signatures.

10. The system as claimed in claim 1, wherein:
said execution electronics is integrated into a gateway.

11. The system as claimed in claim 1, wherein:
said configuration electronics is integrated into a network device, into a router or into a switch.

12. The system as claimed in claim 1, wherein:
said first communication network is a wireless or wired fieldbus according to a fieldbus protocol of automation technology.

13. The system as claimed in claim 1, wherein:
said second communication network has an industrial Ethernet protocol, Ethernet/IP, HART-IP or Profinet.

14. A microservice for use in a system comprising:
a system for monitoring a plant of automation technology, wherein the plant has a plurality of field devices and the field devices can communicate via at least a first communication network with one another and with a control unit, comprising: an execution electronics, which can communicate with at least one of the field devices; and a configuration electronics, which is arranged removed from the execution electronics and which can communicate with the execution electronics via a second communication network, wherein: said configuration electronics and/or the execution electronics has at least one microservice, which is appropriate for the type of the field device and which is embodied to provide at least one functionality for execution in the execution electronics and/or in the configuration electronics; wherein the microservice is generated based on a device model produced from information concerning the field device, wherein the device model is a EDD- or FDI-device description.

15. The microservice as claimed in claim 14, wherein:
the microservice is present in a binary and/or encrypted file format and/or is provided with a digital signature.

* * * * *